(12) United States Patent
Miller

(10) Patent No.: US 7,081,695 B2
(45) Date of Patent: Jul. 25, 2006

(54) ADJUSTABLE FIT WEDGES

(75) Inventor: Mark Miller, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 101 days.

(21) Appl. No.: 10/734,820

(22) Filed: Dec. 13, 2003

(65) Prior Publication Data

US 2005/0127779 A1    Jun. 16, 2005

(51) Int. Cl.
*H02K 5/00* (2006.01)
*H02K 1/22* (2006.01)

(52) U.S. Cl. ............... 310/91; 310/214; 310/270; 29/458; 29/596

(58) Field of Classification Search ............ 310/91, 310/214, 270
See application file for complete search history.

(56) References Cited

U.S. PATENT DOCUMENTS

| | | | | |
|---|---|---|---|---|
| 3,745,395 A | * | 7/1973 | Koechlin | 310/260 |
| 4,200,818 A | * | 4/1980 | Ruffing et al. | 310/214 |
| 4,239,998 A | * | 12/1980 | Hakamada et al. | 310/45 |
| 4,385,252 A | * | 5/1983 | Butman et al. | 310/214 |
| 4,439,701 A | * | 3/1984 | Okamoto et al. | 310/45 |
| 4,774,429 A | * | 9/1988 | Ueda | 310/214 |
| 4,800,314 A | * | 1/1989 | Ward et al. | 310/260 |
| 6,316,859 B1 | * | 11/2001 | Aoyama et al. | 310/214 |
| 6,486,575 B1 | * | 11/2002 | Miller | 310/43 |

FOREIGN PATENT DOCUMENTS

DE    2153958 B  *  5/1978

* cited by examiner

*Primary Examiner*—Darren Schuberg
*Assistant Examiner*—Erik Preston

(57) ABSTRACT

The present invention provides for a fitted wedge wherein a formed outer frame is loosely fitted into a desired gap. The formed outer frame contains a lateral gap such that the formed outer frame is substantially or completely divided into two halves. A thin, stiff sheet coated with a resin saturated felt is then inserted between the two halves of the outer frame. The two halves are pushed apart, snuggly fitting the formed outer frame into place. The resin in the felt is then cured, forming a single, snuggly fit wedge.

19 Claims, 4 Drawing Sheets

ADJUSTABLE FIT WEDGES

BACKGROUND OF THE INVENTION

The electric field of a power generator comes from the rotor coils that run the length of the rotor. As the coils approach the end of the rotor, they are bent and seemingly re-inserted again down the length of the rotor. FIG. 1 illustrates one example of how the end of a rotor 20 may appear. As the coil 26, also referred to as a conductive winding, approaches the end of the rotor shaft 22 it is bent 30, made to run axially 28, and then traces a route back down the length of the rotor shaft on the opposite site (not shown). As shown, the rotor comprises many neighboring coils 24 aligned in unison around the rotor shaft.

Along the length of the shaft, the coils are located in specific slots. However, as the coils approach the end of the rotor, the ability to exactly place them into pre-determined paths is limited. This is part due to the fact that the coils are wrapped, arranged and/or bent by a manual processes. It is essential, however, that the coils be separated not only by electrically insulating materials, but also that they are firmly held in place to guard against radial and circumferential movement. To this end, rotor blockings 32 are inserted between the coils to hold them secure against substantial electromagnetic and vibratory forces which tend to dislodge and move the coils. Movement will reduce the life of the coils, as well as the rotor blockings Although the blockings may be manufactured to fit generally desired dimensions, when they are being inserted between the coils they need to be carefully machined to obtain a tight fit between the coils. This is an arduous process that relies heavily on the craftsmanship of the fitter. The blockings need to be tested for fit, then machined, tested again and often machined many more times.

Since tight fits are needed, the blockings and wedges are often forced into position. This often results in damage to the coils. What is needed are improved blockings that are more easily fit into position without the use of damaging force.

SUMMARY OF THE INVENTION

The present invention provides for a fitted wedge wherein a formed outer frame is loosely fitted into a desired gap. The formed outer frame contains a lateral gap such that the formed outer frame is substantially or completely divided into two halves. A thin, stiff sheet coated with a resin saturated felt is then inserted between the two halves of the outer frame. The two halves are pushed apart, snuggly fitting the formed outer frame into place. The resin in the felt is then cured, forming a single, snuggly fit wedge.

In one embodiment, the materials of the fitted wedge are electrically insulating.

In another embodiment the inner layer comprises a plurality of stiff sheets.

In another embodiment multiple wedges are fitted into position before they are collectively cured.

DETAILED DESCRIPTION OF THE INVENTION

The present invention provides for fitted wedges wherein a formed outer frame is loosely fitted into a desired gap. The formed outer frame contains a lateral gap such that the formed outer frame is substantially or completely divided into two halves. A thin, stiff sheet coated with a resin saturated felt is then inserted between the two halves of the outer frame. Note that this resin is often different than the types used to make the face plates or stiff sheet. The two halves are pushed apart abutting the perimeter of the spacing between rotor coils. Further, the two halves are forced against any abutment so that the formed outer frame is snuggly fit into place. The resin in the felt is then cured, forming a single, snuggly fit wedge.

Figure 1:
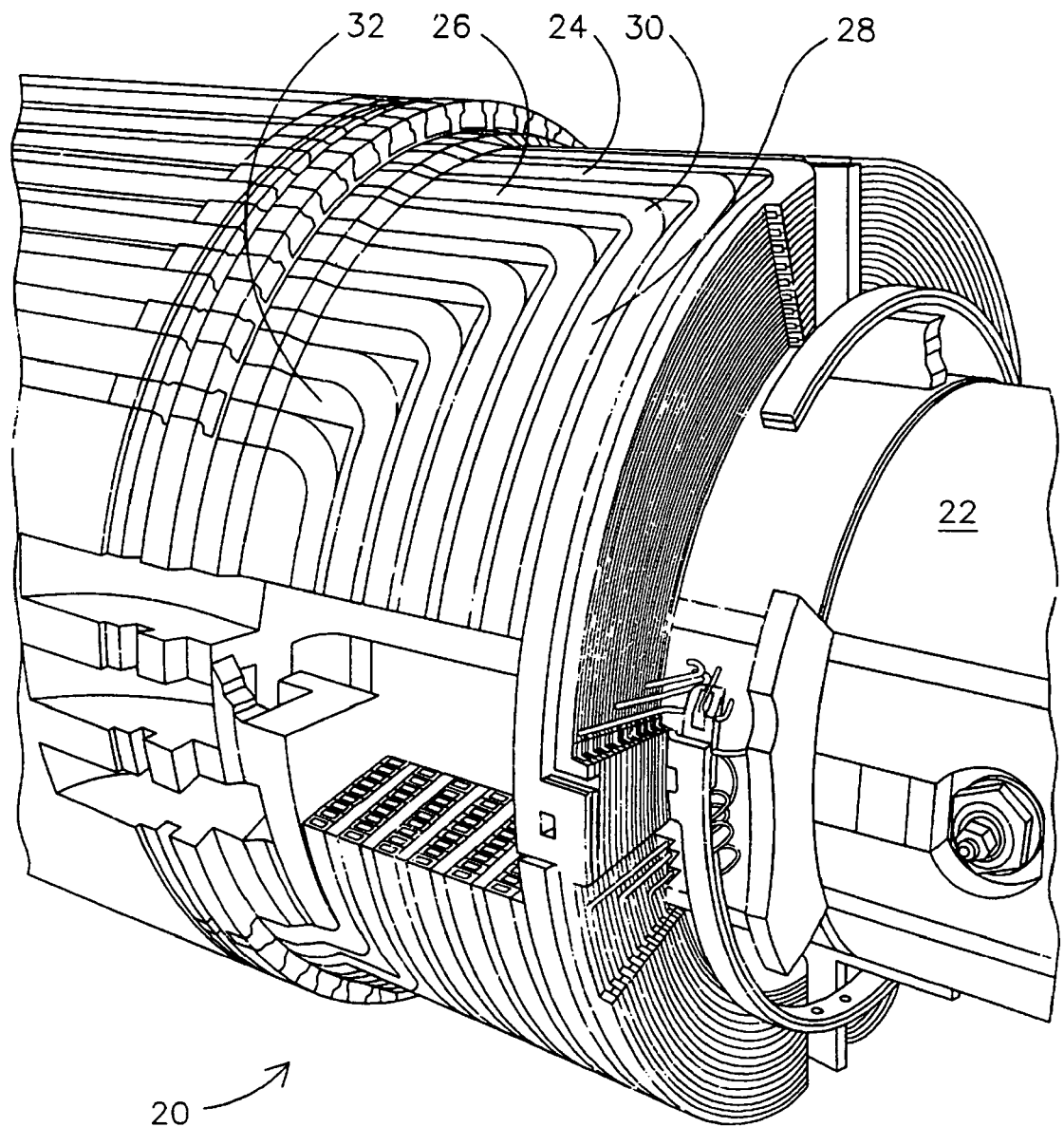
FIG. 1 illustrates a generator with rotor blocking wedges.

As shown in FIG. 1, a particular application of the present invention is in the use of rotor blockings for power generators. Rotor blockings support, separate and insulate conductive windings in the generator rotor. Due to the harsh environment, the rotor blockings must withstand temperatures that can range from about −40° C. to about 180° C., and centrifugal loading at about 1500 rotations per minute (RPM) to about 4500 RPM. The rotor blockings come in a variety of sizes and shapes, and may also include channels that direct a coolant flow (e.g. air, hydrogen) over the conductive windings during generator operation.

Figure 2:
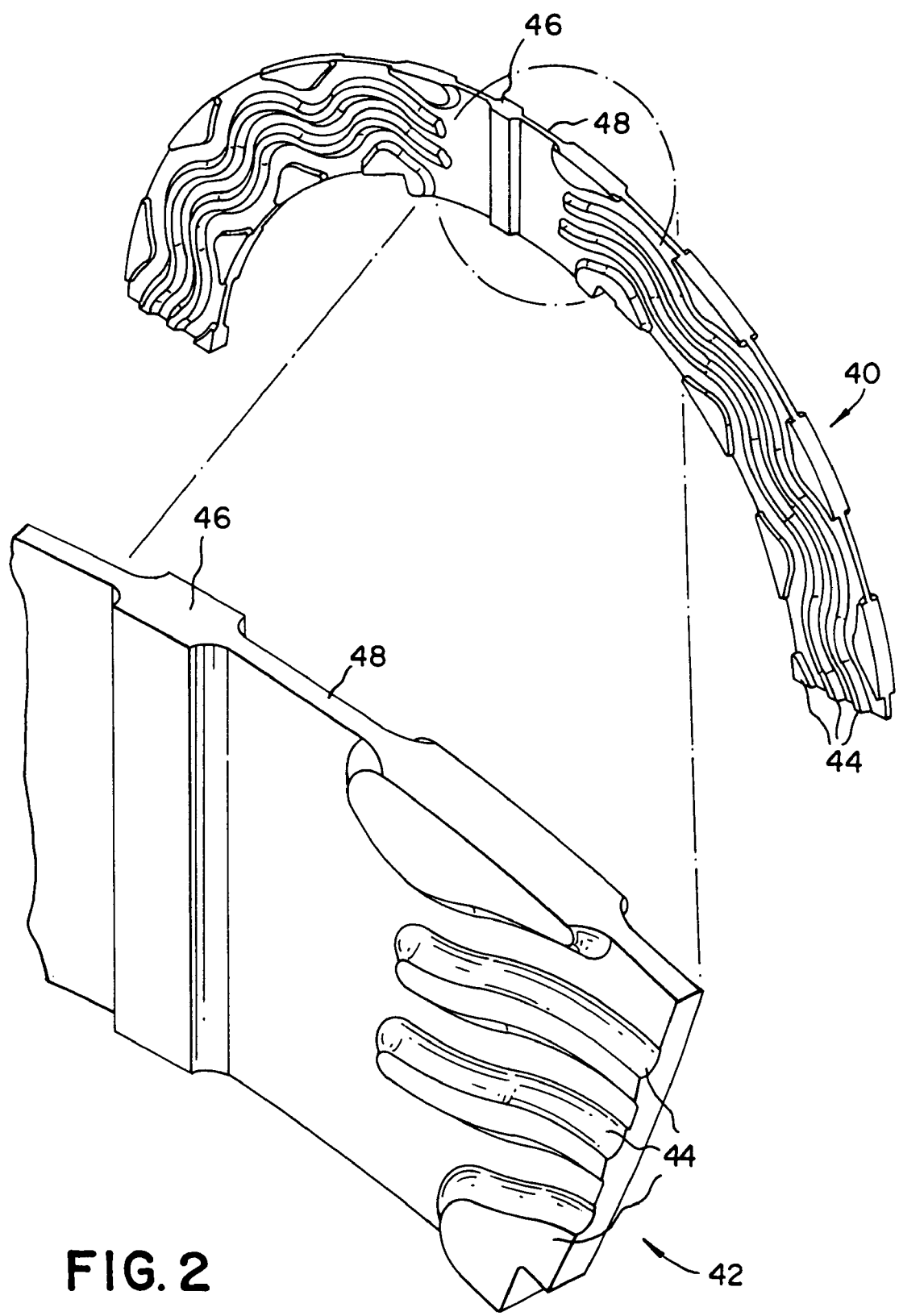
FIG. 2 illustrates one example of a rotor blocking.

An example of a typical radial blocking can be seen in FIG. 2. Blockings come in a wide range of shapes and sizes, various examples can be found in U.S. Pat. No. 6,486,575, which is incorporated herein by reference. The radial blocking 40 is essentially pre-formed in the desired shape, an enlarged section of which is also shown 42. Raised areas 44 are used to direct coolant flow. This provides for a wedge that has a varying thickness 46, 48. The thinner portions will be at least thick enough to maintain strength and integrity, while the thicker portions will abut neighboring machinery. The rotor blockings can be formed from a variety of molding techniques, such as vacuum casting, compression molding, vented injection molding and compression-injection molding, as well as other conventional methods such as machining or other techniques known in the art.

Figure 3A:
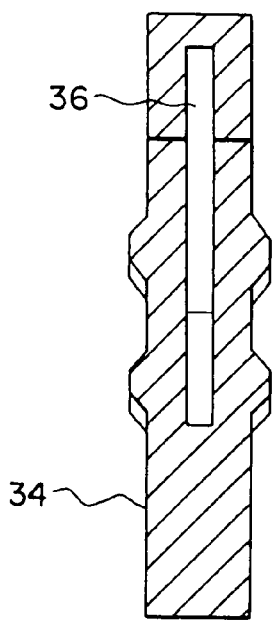
FIGS. 3A and 3B illustrate an example of a lateral gap in a wedge according to the present invention.
Figure 3B:
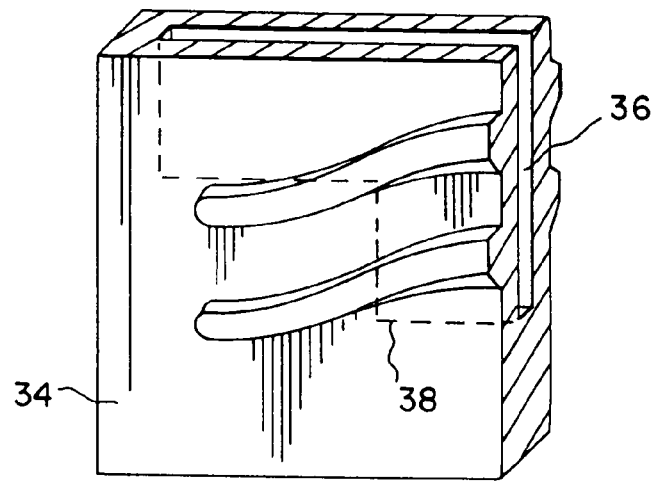

In the present invention, the wedges (rotor blockings) are formed with a gap lengthwise down the middle. This gap may be created when the wedge is formed, or cut into it at a later point. The gap may span only a portion of the wedge, or it may cut the wedge entirely into two. Even when the wedge is not cut or formed entirely into two halves, the lateral gap delineates a first and second half of the wedge. FIGS. 3A and 3B show a simplified example of a wedge 34 with a lateral gap 36 formed/cut partially into it. The lateral gap can be uniformly spaced through the wedge or conform to any number of different patterns 38.

An inner layer, which comprises a stiff sheet material, is then inserted into the lateral gap. The stiff sheet material is felt coated, and a resinous substance is saturated in the felt. As the inner layer is forced into the lateral gap, the two halves of the wedge, which is referred to as the outer formed frame or face plating, are forced apart. This causes the entire wedge to be snuggly fitted into place, without abrading or forcing the wedge in against the abutting machinery. After the inner layer is in place, the resin is cured, which secures the inner layer within the lateral gap.

Figure 4:
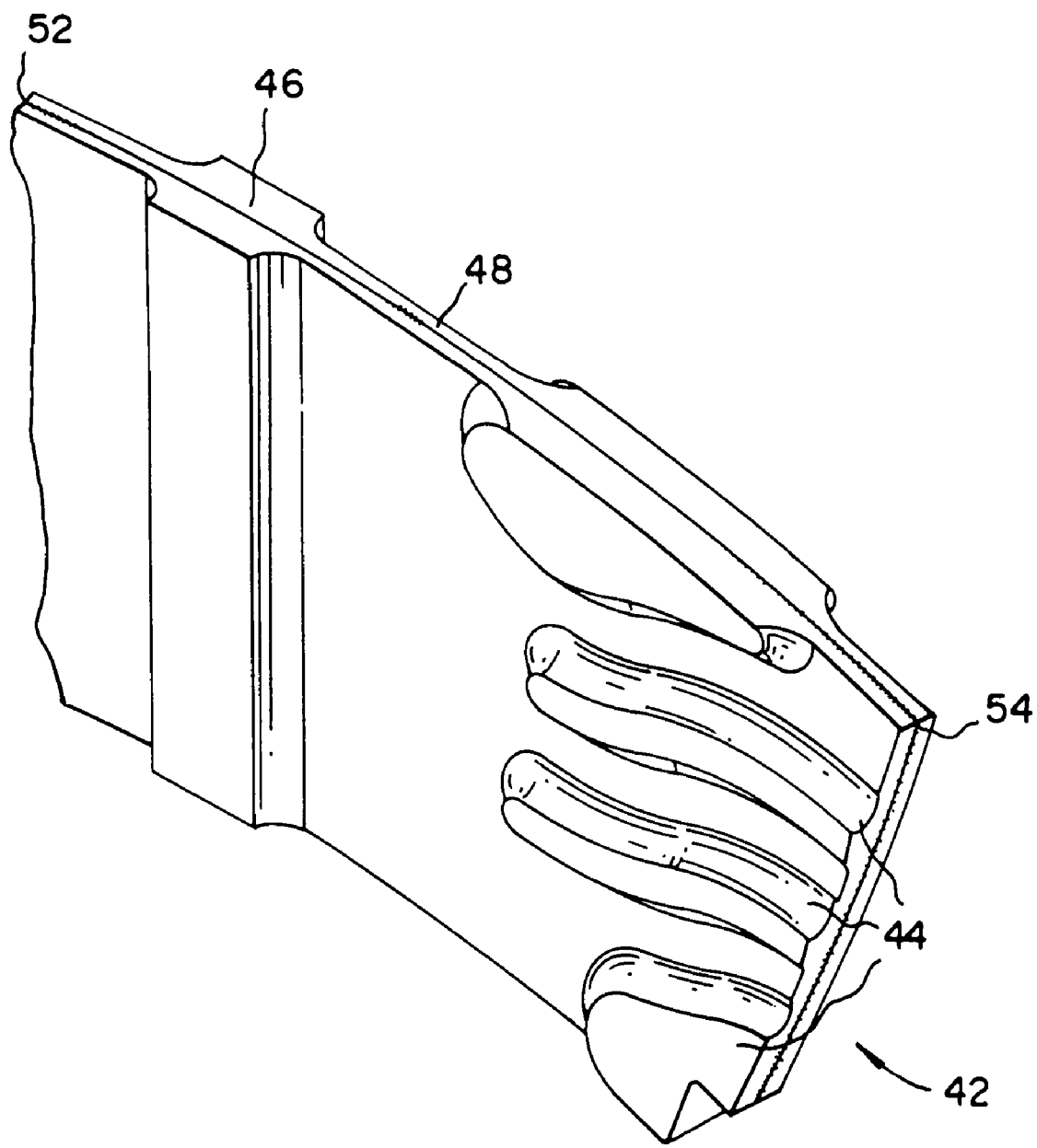
FIG. 4 illustrates an example of a rotor blocking according to the present invention.

FIG. 4 illustrates one example of what the insertion of the inner layer may look like in a radial blocking from FIG. 2. The inner layer comprises a stiff sheet material 52 with felt 54 mounted on either side. In this example the sheet material is thin relative to the thickness of the outer formed frame 48. However the thickness of the stiff sheet material can vary greatly, and even multiple sheets may be used simultaneously. The stiff sheets may vary in thickness, but in one embodiment are from 0.3 mm to 3.0 mm thick. The stiff sheet may also have tapered ends so as to be more easily inserted into the formed frame. Also in this example, the felt is mounted on both sides of the stiff sheet material. In other embodiments the felt is mounted only one side, or in particular patterns on one or both sides.

Figure 5:
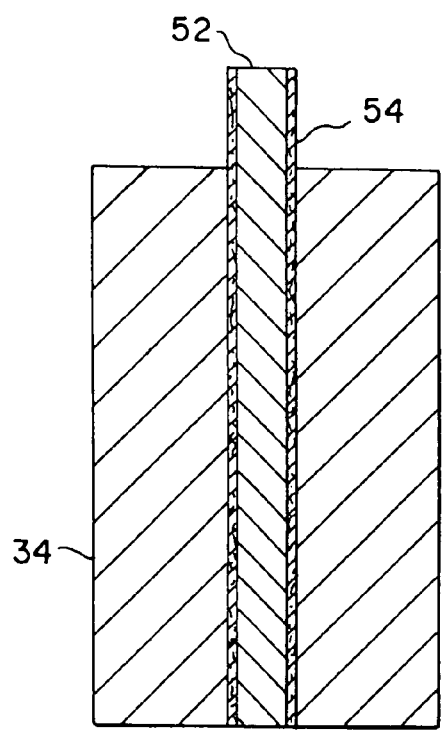
FIGS. 5 and 6 illustrate examples of wedges according to the present invention.
Figure 6:
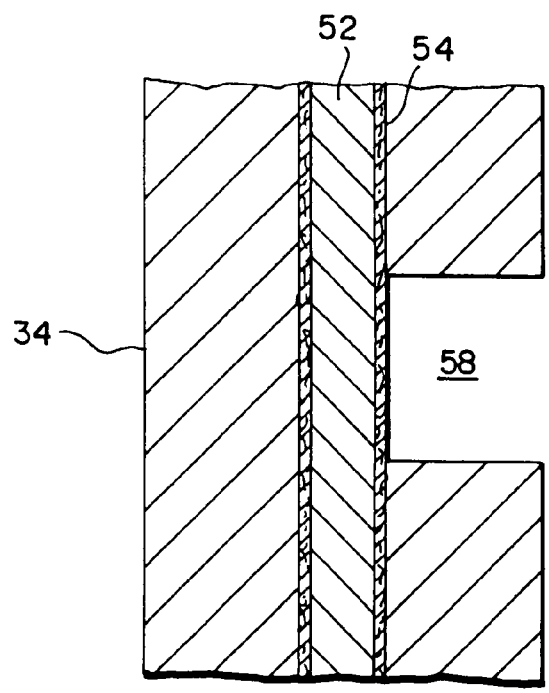

FIG. 5 illustrates an embodiment where the inner layer protrudes from the lateral gap. Since the inner layer may be inserted manually, it can be advantageous to have an extra long inner layer to snuggly fill the lateral gap. After being fit into place, the inner layer can then be trimmed as required. FIG. 6 illustrates one example where the outer formed frame has a deep enough groove to where it breeches the lateral gap. In this embodiment the inner layer is exposed.

As discussed above, in a generator, coils are positioned within cavities or slots, and the rotor blockings are positioned to overlie the coils. Since the coils are formed of coated steel material, the rotor blockings, and primarily the outer formed frame, are formed of a non-conductive material, such as an epoxy-laminated glass material, so that a short is not created which can damage various portions of the generator. Other materials include alternating resin and glass layers. Also, more than one resin and/or glass may be used. In this fashion, combined material properties of different resins are used, such as blending a resin having high stiffness with a resin matrix having good strain resistance. Even more materials include examples that are found in U.S. Pat. Nos. 6,486,575, 6,124,659, 5,365,135 and 4,656,382, all of which are incorporated herein by reference.

The stiff sheet material needs to be strong enough to be forced end-on into a tight space. Unlike in the conventional method of force-fitting a wedge, by use of the present invention the would be damaging stresses are mostly internal to the wedge rather than the abutting machinery. It is also preferably that the stiff sheet material be flexible so that portions are not broken off inside of the outer formed frame during insertion. Advantageously the strength of the stiff sheet material is at least about 50 giga-newtons per square millimeter ($GN/mm^2$), but could be as high as 1000 $GN/mm^2$ or higher. When used in generators, the material is also electrically insulative to help inhibit electrical conduction along the surface of the rotor blocking, which could otherwise cause turn-to-turn shorts in the conductive winding. Suitable reinforcement materials include glass and mineral filler. More specifically, fibers or particles of E-glass, S-glass, calcia, magnesia or alumina can be used. These reinforcement materials are commercially available from BGF Industries, Inc, Anchor Reinforcements and Hexcel Schwebel. Inorganic fibers or particles are preferred because of their high stiffness, low cost, and ease of processing. It will be understood by one skilled in the art that, depending on the particular article of manufacture, and the properties advantageous to that article of manufacture, other materials could be used, such as thermoplastics, and other ceramics. Common thin, stiff sheet materials are NEMA GPO, G5, G9, G10, G11 and the like.

The felt material may be any type of material suitable to stay attached to the stiff sheet material while being an absorbent medium for the resin. Also, when used for generator applications, such as rotor blockings, the felt, like the rest of the wedge, is electrically insulating. Examples of felt materials include polyester, glass fiber, nylon, Kevlar®, NOMEX® and Aramid®. In some embodiments the felt material may not be required, and resin coated stiff sheets would be used.

The resin refers to any viscous or semi-viscous substance capable of being saturated in the felt, or if the felt is not present, adhered to the stiff sheet material. In the generator application discussed above, the resin material is advantageously thermoset with a glass transition temperature above the maximum operating temperature of the rotor winding (typically about 140° C. to about 180° C.) to maintain the integrity and properties of the rotor block. The resin material is also advantageously capable of being processed as a low viscosity liquid in order to coat and have low solubility to trapped volatiles that would otherwise create voids. Suitable bonding resin materials include epoxy thermosets, polyester thermosets, phenolic thermosets, acrylic thermosets and the like. More specifically, epoxies, and polyester and phenolic based bonding resins are used. These resin materials are commercially available from the Ciba Specialty Chemicals Company, the Dow Chemical Company and the Reichold, Inc. It will be understood by one skilled in the art that, depending on the particular article of manufacture, and the properties that are advantageous to that article of manufacture, other resin materials could be used, such as high temperature thermoplastics. Partially cured thermoset resins, commonly called b-staged resin, may also be used. These resins have the advantage of being easy to handle but still able to be pressed into a tight spot and then hardened by curing.

In one embodiment the present invention provides for a method for forming wedges in a space by placing an outer frame into the space. The outer frame may be two pieces or a single piece with a lateral gap through a portion thereof. Inserted into the gap is a stiff sheet material that is partially or fully coated with a felt material that is saturated with a bonding resin. The inserting of the stiff sheet material forces the outer frame apart so that it presses against surrounding abutments. The resin is then cured so that the wedge is held securely in place.

In another embodiment the present invention provides a method for forming wedges in a space. An outer formed frame is placed into the desired space. The formed frame may be formed by a variety of techniques known in the art. The size of the formed frame should be such that it is thinner than the place where the wedge is to be provided. The formed frame comprises a lateral gap as described above. An inner layer is then inserted into the lateral gap. The inner layer comprises a stiff sheet material that is at least partially felt coated, and the felt is saturated with a resin. As the inner layer is forced into the lateral gap, the formed outer frame is forced apart to snuggly fill the gap. The resin saturated in the felt is pushed out where the spaces are too narrow, but otherwise creates a near perfect fit. The resin is then cured, ensuring that the wedge remains snug.

In a particular embodiment the wedges, including the outer formed frame and stiff sheet with a resin impregnated felt, are pre-assembled prior to being placed into the desired space.

In one embodiment a plurality of wedges are fitted into position before they are collectively cured.

In one embodiment the lateral gap bisects the outer formed frame.

In another embodiment the inner layer is trimmed after insertion so that it is flush with the outer formed frame.

In another embodiment the outer formed frame is machined for a better fit in the desired space before inserting the inner layer.

In a particular embodiment the inner layer comprises two or more stiff sheet material.

In another particular embodiment the outer formed frame is made out of a glass or glass resin composition. The stiff sheet material is also a glass or glass resin material. The felt material at least one of glass, polyester, nylon and mixtures thereof, and the bonding or saturating resin comprises at least one of epoxy thermosets, polyester thermosets, phenolic thermosets, acrylic thermosets, and mixtures thereof. The saturating resin bonds the pieces of the wedge assembly together.

In another embodiment the present invention provides for a pre-shaped wedge for use in a generator. Since the spaces that need to be wedged in a generator are substantially known, the wedge may be pre-formed into a fairly accurate shape. However, minor fitting may still needs to be done. Instead of machining the wedge by trial and error, the present invention provides a wedge with an outer formed frame that has a lateral gap therein and an inner layer. The inner layer itself comprises a stiff sheet material that is partially or wholly coated with a felt material that itself is saturated in a resin. Once the inner layer, which is shaped to fit the lateral gap, is in place the resin may be cured, hardening and securing the entire wedge. All materials in the wedge are electrically insulating. Resins may be cured by techniques known in the art, which include heating, running of low electrical currents, catalytic additives and mixtures thereof.

In one embodiment the inner layer transverses a limited portion of the outer formed frame, and in an alternate embodiment it transverses the entirety of the outer formed frame.

In a particular embodiment the outer formed frame is made out of a glass or glass resin composition. The stiff sheet material is also a glass or glass resin material. The felt material at least one of glass, polyester, nylon and mixtures thereof, and the saturating or bonding resin comprises at least one of epoxy thermosets, polyester thermosets, phenolic thermosets, acrylic thermosets, and mixtures thereof.

In another particular embodiment at least two stiff sheets are used in the inner layer. The stiff sheets may have varying degrees of felt coating, and may be composed of different materials, and have different saturating resins.

In another particular embodiment one or more resin saturated felt layers are used without stiff sheets. This embodiment employs cured or semi-cured resins that are stiff enough to be used without the stiff sheet element.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for forming wedges in a space comprising:
   placing an outer frame into said space, wherein said outer frame is thinner than said space and wherein said outer frame contains a lateral gap;
   inserting into said lateral gap an inner layer, wherein said inner layer comprises at least one stiff sheet material coated with a felt material that is saturated with a resin, wherein the inserting of said inner layer forces said outer frame onto abutments on either side of said space; and
   curing said resin;
   wherein said wedge snuggly fits into said space and remains snuggly fit after said resin is cured;
   wherein said outer frame makes up a bulk of said wedge.

2. A method of forming wedges in a space comprising;
   obtaining an outer formed frame, wherein said outer formed frame is thinner than said space and wherein said outer formed frame contains a lateral gap;
   placing said outer formed frame into said space;
   inserting into said lateral gap an inner layer, wherein said inner layer comprises a stiff sheet material and wherein a felt material is mounted on at least one side of said inner layer;
   wherein the inserting of said inner layer forces said outer formed frame onto abutments on either side of said space;
   wherein a resin is saturated in said felt material; and
   curing said resin;
   wherein said wedge snuggly fits into said space and remains snuggly fit after said resin is cured;
   wherein said outer formed frame makes up a bulk of said wedge.

3. The method of claim 2, wherein said lateral gap bisects said outer formed frame.

4. The method of claim 2, further comprising trimming said inner layer so that said inner layer is flush with said outer formed frame.

5. The method of claim 2, further comprising machining said outer formed frame prior to inserting said inner layer.

6. The method of claim 2, wherein said inner layer comprises a plurality of stiff sheet materials.

7. The method of claim 2, wherein said outer formed frame comprises at least one of a glass material and a resinous glass material.

8. The method of claim 2, wherein said stiff sheet material comprises at least one of a glass material and a resinous glass material.

9. The method of claim 2, wherein said felt material comprises at least one of glass, polyester, nylon and mixtures thereof.

10. The method of claim 2, wherein said resin comprises at least one of epoxy thermosets, polyester thermosets, phenolic thermosets, acrylic thermosets, and mixtures thereof.

11. The method of claim 2, wherein said felt material is mounted on said stiff sheet material is a predetermined pattern.

12. The method of claim 11, wherein said predetermined pattern is in line with the approximate area of where said outer formed frame is forced onto said abutments on either side of said space.

13. The method of claim 11, wherein inserting a portion of said inner layer into said lateral gap is performed prior to inserting said outer formed frame into said space.

14. A wedge pre-shaped for use in a generator comprising:
   an outer formed frame;
   an inner layer, wherein said inner layer comprises at least one stiff sheet material; and
   a felt material mounted on at least one side of said inner layer;
   wherein said felt material is saturated with a resin;
   wherein said inner layer is shaped to fit in a lateral gap within said outer formed frame;
   wherein said wedge is electrically insulating;

wherein said outer formed frame makes up a bulk of said wedge;

wherein said lateral gap bisects said outer formed frame.

15. The wedge of claim 14, wherein said inner a layer transverses a limited portion of said outer formed frame.

16. The wedge of claim 14, wherein said outer formed frame comprises at least one of a glass material and a resinous glass material.

17. The wedge of claim 14, wherein said stiff sheet material comprises at least one of a glass material and a resinous glass material.

18. The wedge of claim 14, wherein said felt material comprises at least one of glass, polyester, nylon and mixtures thereof.

19. The wedge of claim 14, wherein said resin comprises at least one of epoxy thermosets, polyester thermosets, phenolic thermosets, acrylic thermosets, and mixtures thereof.

* * * * *